H. N. Conklin,
Door Spring.
Nº 82,804.　　　Patented Oct. 6, 1868.
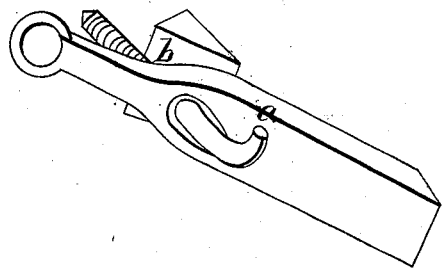
Fig. 1.
Fig. 2.
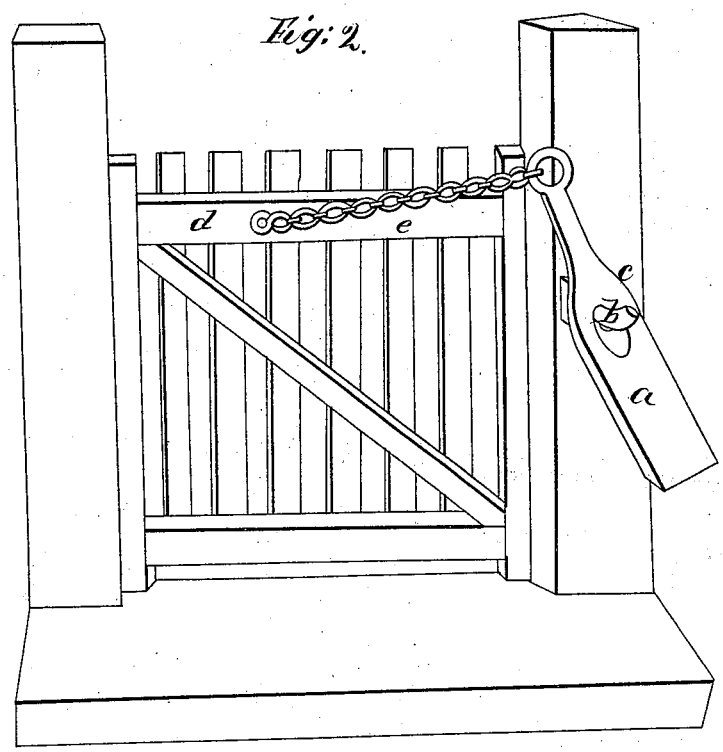
Witnesses:
John W Blake
James M King
Inventor:
Henry N Conklin

United States Patent Office.

HENRY N. CONKLIN, OF INDIANAPOLIS, INDIANA.

Letters Patent No. 82,804, dated October 6, 1868.

IMPROVEMENT IN DOOR AND GATE-CLOSER.

The Schedule referred to in these Letters Patent and making part of the same.

TO ALL WHOM IT MAY CONCERN:

Be it known that I, HENRY N. CONKLIN, of Indianapolis, Marion county, and State of Indiana, have invented a new and improved Gate and Door-Closer; and I do hereby declare that the following is a full and exact description thereof, reference being had to the following drawings, and letters of description marked thereon, of which—

Figure 1 represents the lever and pivot coupled.

Figure 2 represents the manner of applying the same to the gate or door.

The nature of my invention consists in constructing a device to be attached to the gate or door for the purpose of closing the same.

To enable others skilled in the art to make and use the same, I will proceed to describe its construction and operation.

I construct a lever, $a$, of brass or other proper material, also a pivot, $b$, of the same material, attach pivot $b$ to the gate or door-post $c$, and couple lever $a$ to pivot $b$, and attach a chain or rod, $d$, to lever $a$, and attach chain or rod $d$ to the gate or door $e$. The manner of attaching the same is shown in fig. 2; the chain or fastenings to be lengthened or shortened when the gate or door is to be further opened.

The pivot $b$, above referred to, is constructed in the form shown on the drawings, and is designed not only for easy adjustment in a door-jamb or gate-post, but also to afford ready means for attaching or detaching the lever $a$, at the will of the operator.

The advantages of this peculiar conformation become apparent when the fact is considered that the chain is liable to breakage, and a removal thereof for repairs is often necessary. It is valuable also for purposes of removal from one door or gate to another, and for the ease with which it can be arranged on a new gate or door.

I am aware that weighted levers have been used to some extent for the purpose of closing doors, but, so far as I have observed, they are connected with so many ropes and pulleys, as not only to render them expensive in construction, but also very liable to get out of order.

What I claim as my invention, and for which I desire Letters Patent of the United States, is—

A gate or door-closing device, having lever $a$, pivot $b$, and chain $d$, constructed, arranged, and operating substantially as herein specified.

HENRY N. CONKLIN.

Witnesses:
 JAMES M. KING,
 CARTER M. RIGGS.